United States Patent
Wu et al.

(10) Patent No.: US 10,601,297 B2
(45) Date of Patent: Mar. 24, 2020

(54) MOTOR WITH MAGNETIC ELEMENT TO PAIR FAN FOR GENERATING INDUCTION POWER

(71) Applicant: TECO Electric & Machinery Co., Ltd., Taipei (TW)

(72) Inventors: Chia-Ching Wu, Taipei (TW); Feng-Chieh Lin, Taipei (TW); Chia-Jen Lin, Taipei (TW)

(73) Assignee: TECO ELECTRIC & MACHINERY CO., LTD., Taipei (TW)

( * ) Notice: Subject to any disclaimer, the term of this patent is extended or adjusted under 35 U.S.C. 154(b) by 419 days.

(21) Appl. No.: 15/457,163

(22) Filed: Mar. 13, 2017

(65) Prior Publication Data

US 2018/0234005 A1 Aug. 16, 2018

(30) Foreign Application Priority Data

Feb. 10, 2017 (TW) .............................. 106104447 A

(51) Int. Cl.
| | |
|---|---|
| H02K 53/00 | (2006.01) |
| H02K 47/20 | (2006.01) |
| H02K 11/00 | (2016.01) |
| H02K 9/06 | (2006.01) |
| H02K 7/18 | (2006.01) |

(52) U.S. Cl.
CPC ......... *H02K 47/20* (2013.01); *H02K 11/0094* (2013.01); *H02K 53/00* (2013.01); *H02K 7/1807* (2013.01); *H02K 9/06* (2013.01); *Y10S 74/09* (2013.01)

(58) Field of Classification Search
CPC .... H02K 47/20; H02K 11/0094; H02K 53/00; H02K 9/06; H02K 7/1807; Y10S 74/09
See application file for complete search history.

(56) References Cited

U.S. PATENT DOCUMENTS

| | | | |
|---|---|---|---|
| 8,946,961 B2 * | 2/2015 | Horng | H02K 21/24 310/113 |
| 9,985,509 B2 * | 5/2018 | Ruff | H02K 35/04 |
| 2014/0346777 A1 * | 11/2014 | Blanchet | H02K 5/12 290/54 |

OTHER PUBLICATIONS

University Physics, Sixth Edition, p. 349-350.*

* cited by examiner

*Primary Examiner* — Jermele M Hollington
*Assistant Examiner* — Leda T Pham
(74) *Attorney, Agent, or Firm* — Muncy, Geissler, Olds & Lowe, PC

(57) ABSTRACT

A motor with self power generation includes a motor body, at least one magnetic element, a shield case, an induction element, a transfer circuit board and a working module. The motor body includes a shaft member. The at least one magnetic element, located at the shaft member, is to generate a dynamic electromagnetic induction space while the shaft member rotates. The shield case, located close to the shaft member, is to shield the shaft member. The induction element, fixed at the shield case, has a portion located inside the dynamic electromagnetic induction space to generate an induction power while the shaft member rotates. The transfer circuit board has a transfer circuit electrically coupled with the induction element to receive the induction power to further generate a working power. The working module, electrically coupled with the transfer circuit, is to receive the working power to execute a default work.

10 Claims, 4 Drawing Sheets

MOTOR WITH MAGNETIC ELEMENT TO PAIR FAN FOR GENERATING INDUCTION POWER

This application claims the benefit of Taiwan Patent Application Serial No. 106104447, filed Feb. 10, 2017, the subject matter of which is incorporated herein by reference.

BACKGROUND OF THE INVENTION

(1) Field of the Invention

The invention relates to a motor, and more particularly to the motor that adds a magnetic element to a fan so as able to utilize an induction element to generate an induction power while a fan rotates, and further to apply a transfer circuit to generate a working power.

(2) Description of the Prior Art

Generally speaking, server motors are widely applied to make people's lives more convenient. Typically, the server motors are mainly equipped to various power and generation facilities. Conventionally, the server motor includes a server driver (or called as a frequency transformer) and a motor. In practical arrangement, the server driver and the motor are electrically connected through a cable.

Modern technology progress, for example the rapid development in internet of things (IoT), has made people's lives much easier and more convenient. In particular, the internet of things has been applied to the field of server motors. For the internet of things to be applied to a server motor, the motor generally has a working module for executing functions of the internet of things. For example, the working module can be a foreign or built-in wireless transmission module. However, current working modules in the marketplace usually needs a connection cable to energize the working module, and therefor it is obvious that current application of the aforesaid motor in the internet of things is inconvenient. Thus, an improvement upon the motor for the internet of things is definitely necessary.

SUMMARY OF THE INVENTION

In view that a cable is necessary for the conventional motor to energize the working module, thus a cumbersome problem arises in the application of the motor with the internet of things. Accordingly, it is an object of the present invention to provide a motor, that uses an induction element to generate an induction power and a transfer circuit to generate a working power, so as to achieve the goal of self generation.

In the present invention, the motor includes a motor body, at least one magnetic element, a shield case, an induction element, a transfer circuit board and a working module. The motor body includes a shaft member. The at least one magnetic element, located at the shaft member, is to generate a dynamic electromagnetic induction space while the shaft member rotates. The shield case, located close to the shaft member, is to shield the shaft member. The induction element, fixed at the shield case, is at least partially located inside the dynamic electromagnetic induction space so as to generate an induction power while the shaft member rotates. The transfer circuit board has a transfer circuit electrically coupled with the induction element so as to receive the induction power to further generate a working power. The working module, electrically coupled with the transfer circuit, is to receive the working power so as to execute a default work.

In one embodiment of the present invention, the at least one magnetic element is a magnet, the shield case is a windshield, the induction element is a metal disk, the working module is an internet of things (IoT) module. The shaft member includes a fan shaft and a fan. The fan is connected to the fan shaft. While the fan shaft rotates the fan, the at least one magnetic element generated the dynamic electromagnetic induction space, and the induction element generates the induction power. In addition, the at least one magnetic element is located at the fan.

In one embodiment of the present invention, the transfer circuit includes a booster circuit, a rectifier circuit and an output circuit. The booster circuit, electrically coupled with the induction element, is to boost the induction power to a booster induction power. The rectifier circuit, electrically coupled with the booster circuit, is to rectify the booster induction power to a DC power. Also, the output circuit, electrically coupled with the rectifier circuit and the working module, is to transform the DC power into the working power, and then to transmit the working power to the working module. In addition, the transfer circuit further includes a tank circuit for storing the working power, and the tank circuit is electrically coupled with the output circuit and the working module. Also, the tank circuit is a capacitor.

In one embodiment of the present invention, the motor further includes at least one extension element. The at least one extension element is fixed at the shield case and extends toward the fan from the shield case to at least one extension end portion thereof. The induction element is connected to the at least one extension end portion so as to be fixed to the shield case through the at least one extension element. In addition, the transfer circuit board is connected to the at least one extension element and located between the induction element and the shield case.

In one embodiment of the present invention, the induction element includes a carrier and an induction coil. The carrier is fixed at the shield case. The induction coil, arranged at the carrier, is at least partially located inside the dynamic electromagnetic induction space.

After adopting the motor provided by the present invention, the transfer circuit can be used to generate the working power, and thus power supply for the working module can be wireless. Thereupon, convenience in practical arrangement can be significantly enhanced.

All these objects are achieved by the motor described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a motor. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Since numerous embodiments of the motor can be organized according to the present invention, however, only two of them are selected for elucidating details of the present invention, and the rest thereof would be omitted herein.

Figure 1:
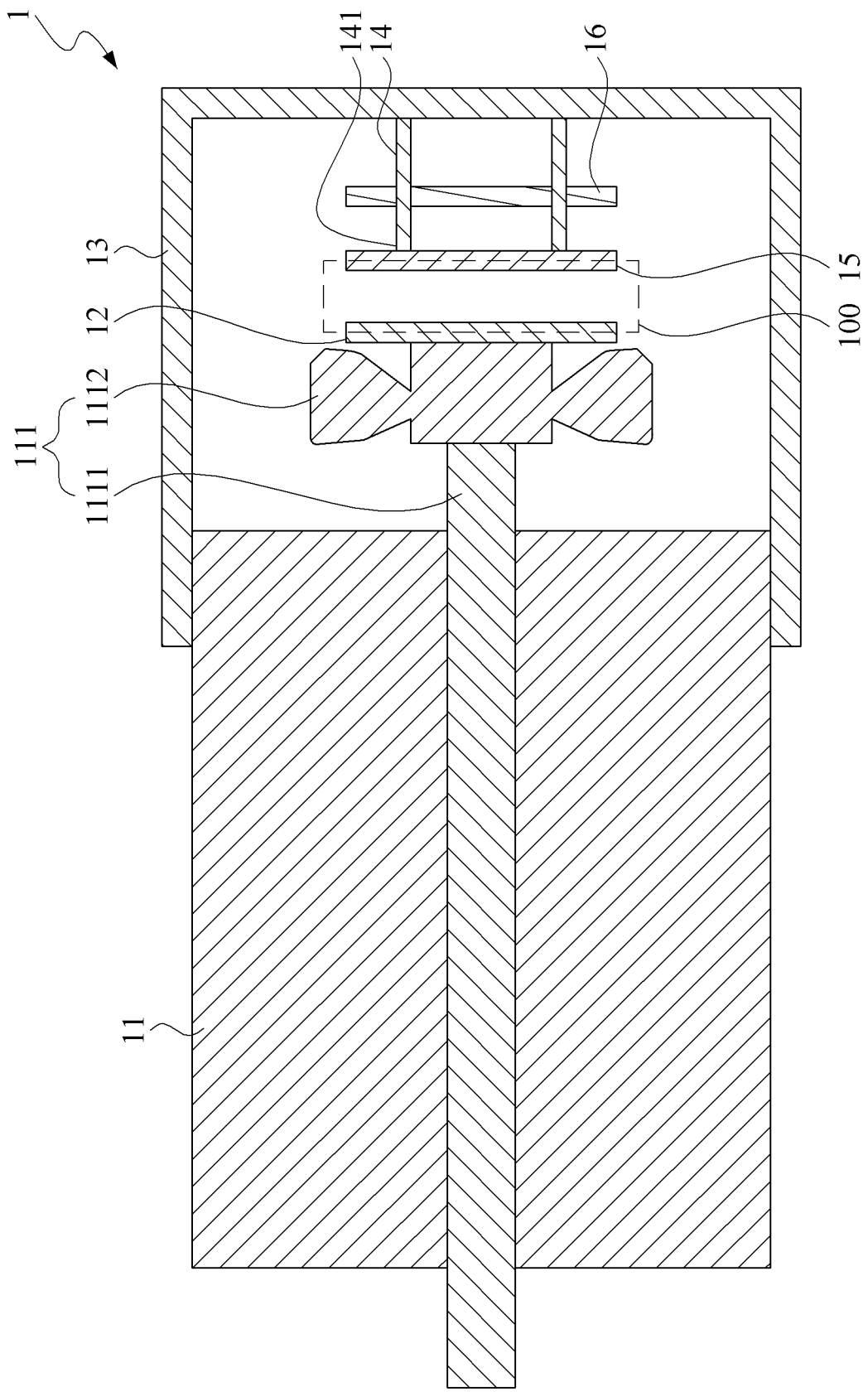
FIG. 1 is a schematic cross-sectional view of a preferred embodiment of the motor invention in accordance with the present invention.
Figure 2:
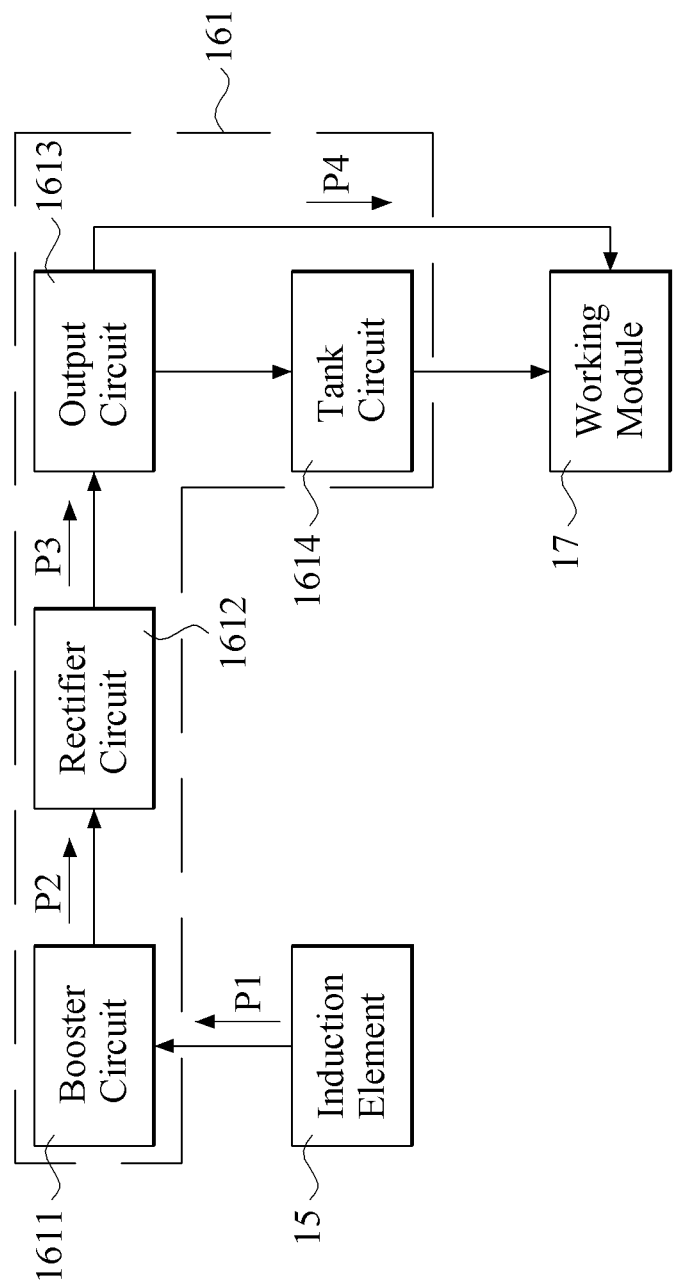
FIG. 2 is a schematic block view of the transfer circuit of FIG. 1.
Figure 3:
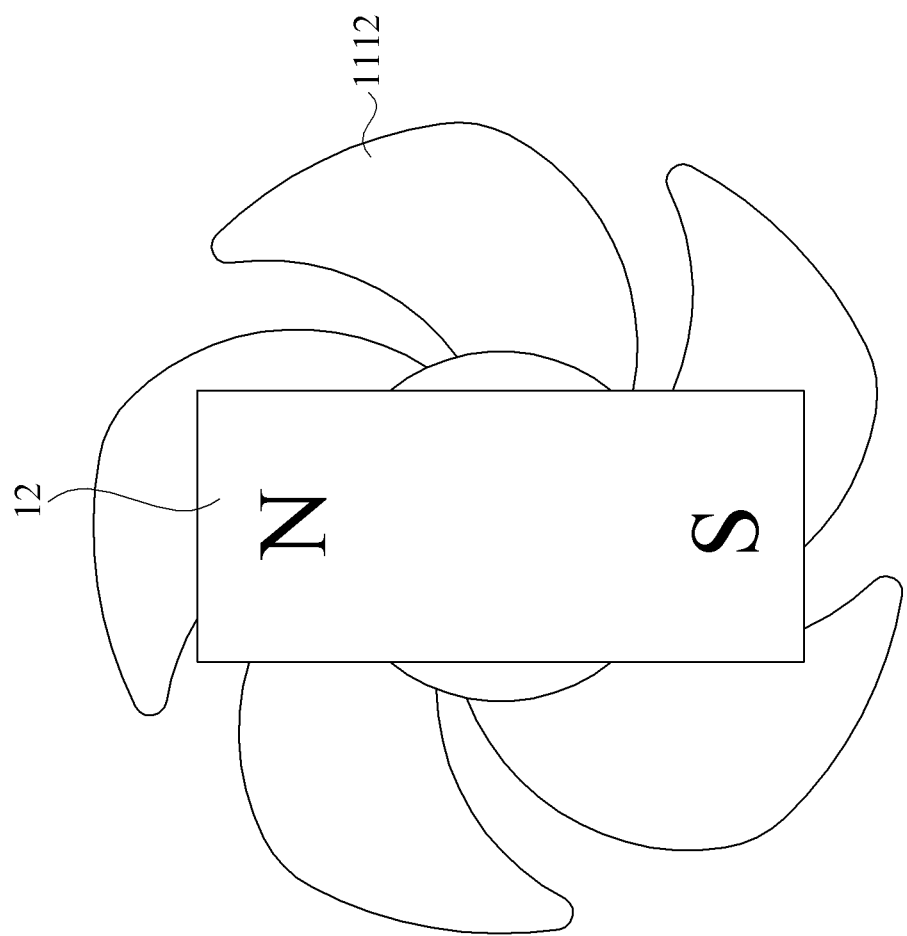
FIG. 3 demonstrates schematically the arrangement of the magnetic element and the fan of FIG. 1.

Refer now to FIG. 1 through FIG. 3; where FIG. 1 is a schematic cross-sectionall view of a preferred embodiment of the motor invention in accordance with the present invention, FIG. 2 is a schematic block view of the transfer circuit of FIG. 1, and FIG. 3 demonstrates schematically the arrangement of the magnetic element and the fan of FIG. 1.

As shown, the preferred embodiment of the motor 1 includes a motor body 11, a fan 1112, at least one magnetic element 12, a shield case 13, at least one extension element 14 (two shown in the figure with only one labeled), an induction element 15, a transfer circuit board 16 and a working module 17.

The motor body 11 includes a shaft member 111, and the shaft member 111 further includes a fan shaft 1111 and a fan 1112 connected with the fan shaft 1111.

The magnetic element 12 of this embodiment is located at the fan 1112 of the shaft member 111. However, in some other embodiments, the magnetic element 12 may be located at the fan shaft 1111. In the present invention, the magnetic element 12 can be a magnet located at a blade or a center of the fan 1112, and can be shaped as a long strip or another 3D configuration. While the shaft member 111 rotates to have the fan shaft 1111 to further rotate the fan 1112, the magnetic element 12 would generate a corresponding dynamic electromagnetic induction space 100.

For example, if the magnetic element 12 is shaped to be a long strip, then the magnetic element 12 can be mounted to a center of the fan 1112, with a total length of the magnetic element 12 slightly less than a gyration diameter of the fan 1112. In addition, the connection between the magnetic element 12 and the fan 1112 can be a locking means, a fastening means or any means relevant to practical requirements. In this preferred embodiment of the present invention, the magnetic element 12 has an N pole at one end and an S pole at another end.

The shield case 13 located close to the shaft member 111 is used to shield the shaft member 111. In this preferred embodiment, the shield case 13 is a windshield, while in another embodiment the shield case 13 may be a housing. The shield case 13 located close to the fan 1112 is used to shield the fan 1112. Generally speaking, an end portion of the shield case 13 can be connected with the motor body 11 so as together to shield thereinside the fan 1112. However, in some other embodiments, the fan 1112 might be shielded by other relevant means.

In the present invention, the at least one extension element 14 can be pillar-shaped and connected with the shield case 13, and extends toward the fan 1112 from the shield case 13 to the at least one extension end portion 141. In addition, though this preferred embodiment applies only two extension elements, yet, in some other embodiments not shown herein, the number of the extension elements is determined according to practical needs.

The induction element 15, fixed to the shield case 13, can be, but not limited to, a metal disk. In other embodiments, the induction element 15 can be a metal ring or a metal with a relevant shape. It shall be explained that the fixation means mentioned above includes direct and indirect fixation means. For example, in this preferred embodiment of the present invention, the induction element 15 is fixed to the shield case 13 via the at least one extension element 14. In other embodiments, the induction element 15 can be directly fitted to the shield case 13. In the present invention, the determination of the fixation means shall depend on practical requirements.

The transfer circuit board 16 includes a transfer circuit 171 electrically coupled with the induction element 15, and is further connected structurally to the at least one extension element 14 by positioning between the induction element 15 and The shield case 13. In this preferred embodiment of the present disclosure, the at least one extension element 14 penetrates orderly, from the shield case 13, the transfer circuit board 16 and the induction element 15, and finally reaches the at least one extension end portion 141. However, in some other embodiments, the aforesaid arrangement (in series) may be different. For example, in an embodiment not shown here, the induction element 15 and the transfer circuit board 16 can be parallel arranged. However, it shall be understood that, in the present invention, determination of the arrangement of the induction element 15 and the transfer circuit board 16 should depend on practical requirements.

In addition, the transfer circuit 161 includes a booster circuit 1611, a rectifier circuit 1612, an output circuit 1613 and a tank circuit 1614. The booster circuit 1611, electrically coupled with the induction element 15, can be any booster circuit already in the marketplace. The rectifier circuit 16712, electrically coupled with the booster circuit 1611, can be any conventional circuit that can transform the alternate current into the direct current. The output circuit 1613, electrically coupled with the rectifier circuit 1612, can be any current voltage-modulating circuit. The tank circuit 1614, electrically coupled with the output circuit 1613, can be, but not limited to, a capacitor.

The working module 17, electrically coupled with the output circuit 1613 and the tank circuit 1614 of the transfer circuit 16, can be, but not limited to, an internet of things (IoT) module or any circuit/device that can execute its own preset function.

While the fan 1112 rotates, the induction element 15 is at least partially located inside the dynamic electromagnetic induction space 100; namely, the induction element 15 at least has a portion to be located inside the dynamic electromagnetic induction space 100, so as to generate an induction power P1 (for example, an induced eddy current with respect to a voltage). After the transfer circuit 161 of the transfer circuit board 16 receives the induction power P1, The booster circuit 1611 would boost the induction power P1 to a booster induction power P2 (from mV to V for example). Then, the rectifier circuit 1612 would rectify the booster induction power P2 into a DC power P3 (i.e., to transform an AC voltage into a DC voltage). The output circuit 1613 would then transform and output the DC power P3 to a working power P4. The working power P4 is further transmitted to the working module 17. In addition, the tank circuit 1614 is implemented to store the working power P4, and the working module 17 would receive the working power P4 so as to perform a default work (for example, but not limited to, a management task, a control operation, a transmission job or at least one of foregoing work) of the working module 17.

Figure 4:
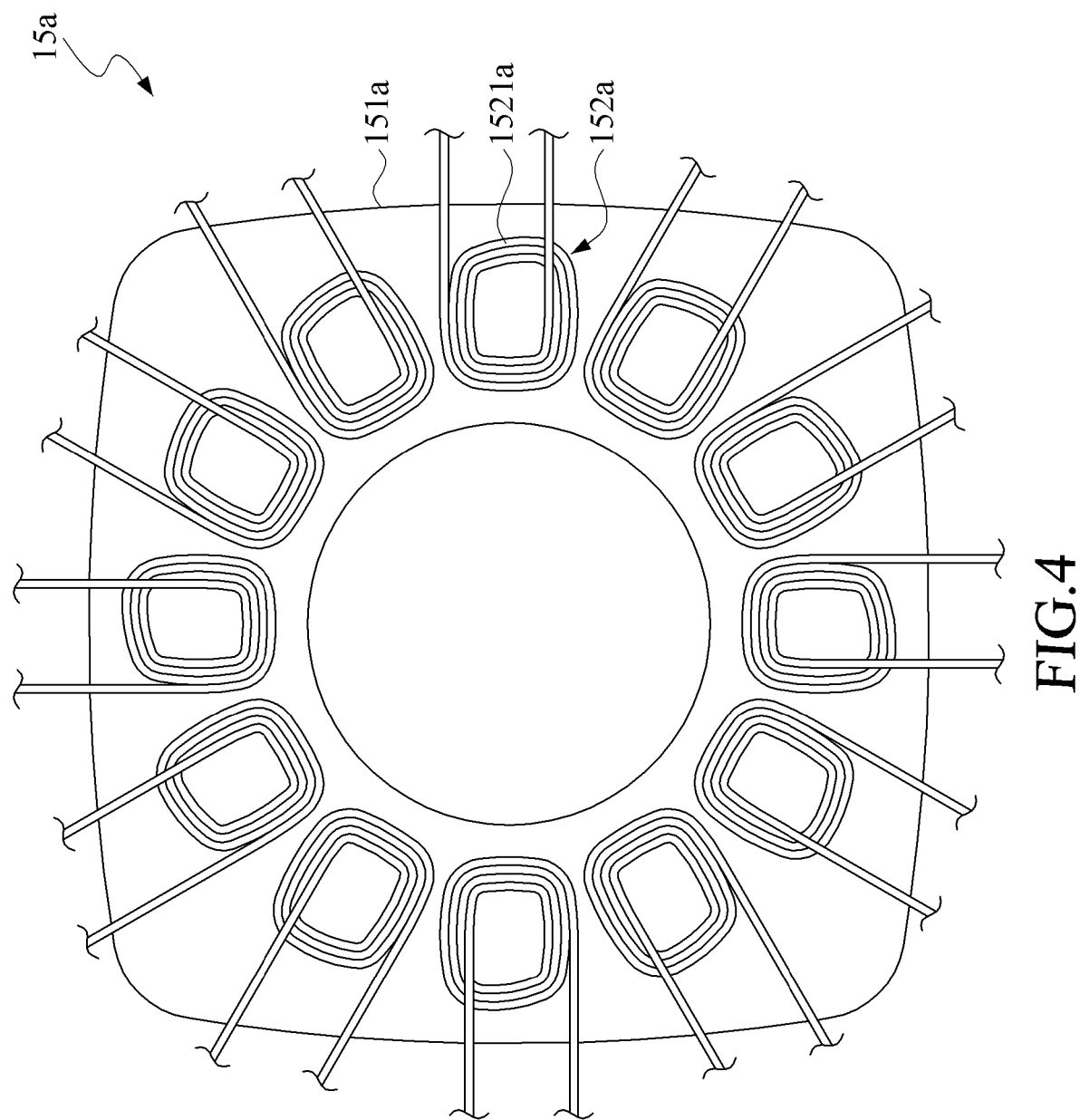
FIG. 4 is a schematic top view of an induction element of another embodiment of the motor invention in accordance with the present invention.

Referring now to FIG. 4, a schematic top view of an induction element of another embodiment of the motor invention in accordance with the present invention is shown. The major difference between the aforesaid preferred embodiment and this current embodiment is that, in this embodiment, the induction element 15a is not a simple metal disk anymore, but an acc including a carrier 151a and an induction coil 152a. The carrier 151a is fixed to the shield case (referring to FIG. 1) by the same fixation means described in the foregoing preferred embodiment. In this embodiment, the induction coil 152a is arranged on the carrier 151a, is at least partially located inside the dynamic electromagnetic induction space; namely, the induction coil 152a is installed with at least a portion thereof being located inside the dynamic electromagnetic induction space (referring to FIG. 1).

In addition, it shall be mentioned that, in this embodiment, the carrier 151a is made of an insulation material, and the induction coil 152a is consisted of a plurality of coil windings 1521a. However, in other embodiments, the induction coil 152a might contain a simple set of coil windings 1521a. Anyway, the determination of the formation on the induction coil depends on practical requirements.

Further, in other embodiments, the carrier 151a can be consisted of two disks. In this circumstance, the induction coil 152a can be located between these two disks, preferably covered and thus protected by these two disks.

In other embodiments, the shield case (referring to FIG. 1) can extend a plurality of extension elements (labeled in FIG. 1), and each of extension end portions of these extension elements is a Y-shape structure. In addition, the induction element 15a can include only the induction coil 152a, and the induction coil 152a is located at the extension end portion (namely, the induction coil 152a is hung at the Y-shape structure).

In summary, after adopting the motor provided by the present invention, the transfer circuit can be used to generate the working power, and thus power supply for the working module can be wireless. Thereupon, convenience in practical arrangement can be significantly enhanced.

While the present invention has been particularly shown and described with reference to a preferred embodiment, it will be understood by those skilled in the art that various changes in form and detail may be without departing from the spirit and scope of the present invention.

What is claimed is:
1. A motor, comprising:
   a motor body, including a shaft member;
   at least one magnetic element, located at the shaft member, and generating a dynamic electromagnetic induction space while the shaft member rotates;
   a shield case, located close to the shaft member and shielding the shaft member;
   an induction element, fixed at the shield case, and at least partially located inside the dynamic electromagnetic induction space so as to generate an induction power while the shaft member rotates;
   a transfer circuit board, having a transfer circuit electrically coupled with the induction element so as to receive the induction power to further generate a working power; and
   a working module, electrically coupled with the transfer circuit, being to receive the working power so as to execute a default work.

2. The motor of claim 1, wherein the shaft member includes:
   a fan shaft; and
   a fan, connected to the fan shaft;
   wherein, while the fan shaft rotates the fan, the at least one magnetic element generated the dynamic electromagnetic induction space, and the induction element generates the induction power.

3. The motor of claim 2, wherein the at least one magnetic element is located at the fan.

4. The motor of claim 1, wherein the at least one magnetic element is a magnet, the shield case is a windshield, the induction element is a metal disk, and the working module is an internet of things (IoT) module.

5. The motor of claim 1, wherein the induction element includes:
   a carrier, fixed at the shield case; and
   an induction coil, arranged at the carrier, and at least partially located inside the dynamic electromagnetic induction space.

6. The motor of claim 5, wherein the transfer circuit further includes a tank circuit for storing the working power, the tank circuit being electrically coupled with the output circuit and the working module.

7. The motor of claim 1, wherein the transfer circuit includes:
   a booster circuit, electrically coupled with the induction element, being to boost the induction power to a booster induction power;
   a rectifier circuit, electrically coupled with the booster circuit, being to rectify the booster induction power to a DC power; and
   an output circuit, electrically coupled with the rectifier circuit and the working module, being to transform the DC power into the working power, then transmitting the working power to the working module.

8. The motor of claim 7, wherein the tank circuit is a capacitor.

9. The motor of claim 8, wherein the transfer circuit board is connected to the at least one extension element and located between the induction element and the shield case.

10. The motor of claim 1, further including at least one extension element, the at least one extension element being fixed at the shield case and extending toward the fan from the shield case to at least one extension end portion thereof, the induction element being connected to the at least one extension end portion so as to be fixed to the shield case through the at least one extension element.

\* \* \* \* \*